United States Patent
Gryb et al.

(10) Patent No.: US 9,288,193 B1
(45) Date of Patent: Mar. 15, 2016

(54) AUTHENTICATING CLOUD SERVICES

(71) Applicant: INTUIT INC., Mountain View, CA (US)

(72) Inventors: Oleg Gryb, San Francisco, CA (US);
Subramanian Kumaraswamy, Cupertino, CA (US)

(73) Assignee: INTUIT INC., Mountain View, CA (US)

( * ) Notice: Subject to any disclaimer, the term of this patent is extended or adjusted under 35 U.S.C. 154(b) by 8 days.

(21) Appl. No.: 13/946,601

(22) Filed: Jul. 19, 2013

Related U.S. Application Data

(60) Provisional application No. 61/839,290, filed on Jun. 25, 2013.

(51) Int. Cl.
*G06F 21/00* (2013.01)
*H04L 29/06* (2006.01)
*G06F 21/62* (2013.01)

(52) U.S. Cl.
CPC ............... *H04L 63/08* (2013.01); *G06F 21/62* (2013.01)

(58) Field of Classification Search
CPC .............................. G06F 21/62; H04L 63/08
USPC ............................................................ 726/5
See application file for complete search history.

(56) References Cited

U.S. PATENT DOCUMENTS

| | | | |
|---|---|---|---|
| 2007/0169182 A1* | 7/2007 | Wolfond et al. | 726/7 |
| 2011/0099616 A1* | 4/2011 | Mazur et al. | 726/7 |
| 2012/0179904 A1 | 7/2012 | Dunn | |

* cited by examiner

*Primary Examiner* — Hadi Armouche
*Assistant Examiner* — Angela Holmes
(74) *Attorney, Agent, or Firm* — Park, Vaughan, Fleming & Dowler LLP; Mark Spiller

(57) ABSTRACT

The disclosed embodiments provide a system that facilitates authenticating cloud services that execute in an untrusted cloud computing environment. During operation, a verifying party receives a request for a credential from a compute instance that is executing in the untrusted cloud computing environment. This request includes one or more metadata parameters that are associated with the compute instance. The verifying party queries a management interface for the untrusted cloud computing environment to retrieve a second set of metadata parameters for the compute instance, and then compares the two sets of parameters. If the values for the two sets of parameters match, the verifying party grants the credential to the requesting compute instance. Otherwise, the verifying party denies the request.

16 Claims, 4 Drawing Sheets

AUTHENTICATING CLOUD SERVICES

RELATED APPLICATION

This application claims priority under 35 U.S.C. §119(e) to U.S. Provisional Application No. 61/839,290, entitled "Authenticating Cloud Services," by Oleg Gryb and Subramanian Kumaraswamy, filed on 25 Jun. 2013, the contents of which are herein incorporated by reference.

BACKGROUND

1. Field of the Invention

This disclosure generally relates to techniques for facilitating use of "cloud computing services." More specifically, this disclosure relates to techniques for establishing a trust relationship with an untrusted cloud computing service.

2. Related Art

The proliferation of the Internet and large data sets have made data centers and clusters of computers increasingly common. For instance, "server farms" typically group together large numbers of computers that are connected by high-speed networks to support services that exceed the capabilities of an individual computer. For example, a cluster of computers may collectively store satellite image data for a geographic area, and may service user requests for routes or images that are derived from this data.

Building and maintaining a server farm can involve considerable expense and expertise. However, some service providers allow users to scalably deploy applications by renting portions of an existing data center on an on-demand basis. For instance, some cloud computing services allow users to rent virtual computing and storage capabilities that can be transparently adjusted as needed to meet changing computing needs over time. Organizations can leverage such platforms as an alternative to maintaining their own data centers, or can selectively use such platforms to flexibly supplement existing data centers during periods of peak load.

While cloud computing services offer flexible compute capabilities, they also involve some limitations and trade-offs. For example, the security policies and deployment of cloud computing services are typically not public, and hence users cannot be certain that secure data sent to or stored in the cloud environment will remain secure. The lack of such assurances sometimes limits the applications that an organization can execute in a cloud environment.

Hence, what is needed are techniques for leveraging cloud computing services without the above-described problems of existing techniques.

SUMMARY

The disclosed embodiments provide a system that facilitates authenticating cloud services that execute in an untrusted cloud computing environment. During operation, a verifying party receives a request for a credential from a compute instance that is executing in the untrusted cloud computing environment. This request includes one or more metadata parameters that are associated with the compute instance. The verifying party queries a management interface for the untrusted cloud computing environment to retrieve a second set of metadata parameters for the compute instance, and then compares the two sets of parameters. If the values for the two sets of parameters match, the verifying party grants the credential to the requesting compute instance. Otherwise, the verifying party denies the request.

In some embodiments, the verifying party compares two compute roles that are assigned to the compute instance and the credential, respectively. If the two compute roles do not match, the verifying party denies the compute instance access to the credential.

In some embodiments, the verifying party tracks the credentials that have been requested by and/or granted to the compute instance to determine anomalous requests. For instance, anomalous requests may include two or more requests for the same credential, requests for credentials that span multiple different compute roles, and an excessively large number of requests for different credentials. In response, the verifying party may deny the request and even issue a command to the management interface to terminate the compute instance.

In some embodiments, the verifying party determines the elapsed time for which the compute instance has been executing, and denies the compute instance access to the credential when this elapsed time exceeds a specified bootstrapping time interval.

In some embodiments, the verifying party tracks previous requests for credentials that were received from compute instances in a lookup table. The tracked requests for a given compute instance can be retired from this lookup table after the elapsed time for the compute instance exceeds the specified bootstrapping time interval.

In some embodiments, the metadata parameters that are compared include: an instance identifier for the compute instance; an instance type associated with the compute instance; a hostname associated with the compute instance; a reservation identifier associated with a group of compute instances that includes the requesting compute instance; an IP address used by the compute instance; and the compute role associated with the compute instance.

In some embodiments, the group of compute instances forms a dynamic auto-scaling group that changes over time based on client request load and other factors. A control application that manages this auto-scaling group is configured to favor starting new compute instances over reusing existing compute instances in order to maintain the security of credentials in the untrusted cloud computing environment.

In some embodiments, the verifying party determines the source IP address from which the request was sent. The verifying party compares this to the IP address included in the parameters supplied by both the management API and the compute instance, and denies the request if the three IP addresses do not match.

In some embodiments, a compute instance receiving a credential is configured to only cache the credential for a limited timeframe to perform an authenticated operation. After completing this operation, the compute instance flushes the stored credential.

DETAILED DESCRIPTION

Figure 1:
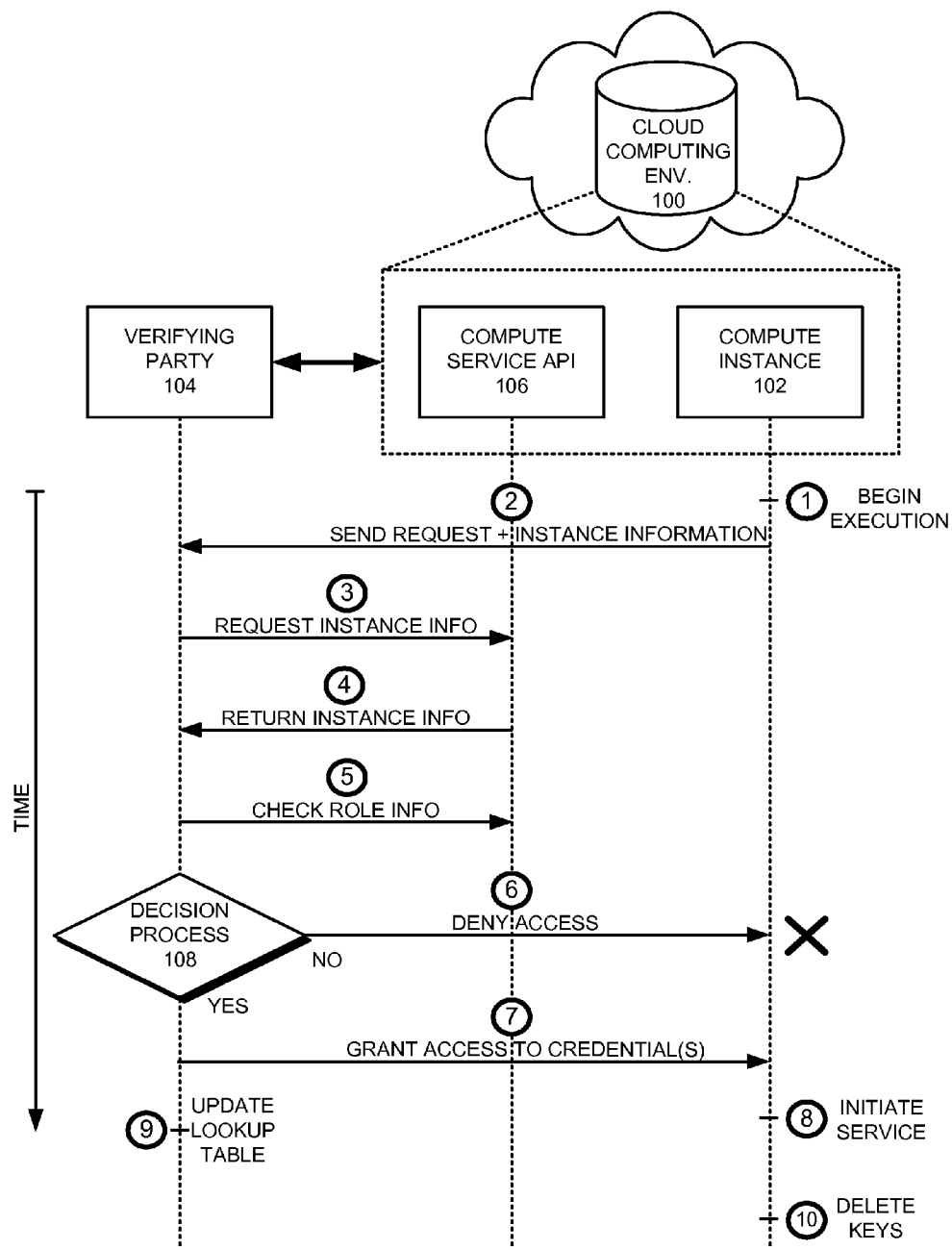
FIG. 1 illustrates an exemplary system in which an application image begins executing as a compute instance in a cloud computing environment in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Trust Issues for Cloud Computing Services

Cloud computing services (also referred to as cloud services) allow users to rent virtual computing and storage capabilities that can be transparently adjusted as needed to meet changing computing needs over time. Organizations may leverage such platforms to flexibly supplement existing data centers during periods of peak load, or may even use such services instead of maintaining their own data centers. For instance, in some scenarios the economies of scale available to cloud computing providers may make renting cloud computing services cheaper, more flexible, and more scalable than building and maintaining dedicated data centers.

Consider as an example Amazon.com's cloud computing service, the Amazon Elastic Compute Cloud (EC2). During operation, clients can transfer executable code to EC2 using "Amazon Machine Images (AMI);" an AMI can include an operating system and any additional functionality (e.g., program instructions and data for a web server, database, or other application logic) that is needed to instantiate and support a given service. Each AMI that has been uploaded to EC2 can then be executed as one or more instances of a service. For example, multiple instances of an AMI that are instantiated to execute in parallel as an "auto-scaling group" may be associated with a load balancer that distributes incoming client requests between the different instances. Note that computational instances in the dynamic EC2 environment can be created, started, stopped or terminated without any human intervention.

While cloud computing services offer flexible compute capabilities, they also involve some limitations and trade-offs. For instance, the security policies and deployment of cloud computing services are typically not public, and hence organizations cannot be certain whether secure data sent to or stored in the cloud environment will remain secure. The lack of such assurances can sometimes limit the set of applications that an organization can execute in a cloud computing environment.

For example, consider an organization that seeks to supplement an existing (private) data center with additional cloud computing services on an as-needed basis, but requires that the data being operated upon remain secure. Application instances executing in the cloud environment need to establish a trust relationship with the private data center to access the secure data stored there (e.g., encryption keys, passwords/passphrases, SSL keys, etc.), but due to the limitations of the cloud environment, may not be guaranteed to be able to safeguard the set of credentials (e.g., secure keys, passwords, or other access capabilities) needed to access such secure data. For instance, in the context of EC2, embedding a machine- or application-level credential (or other secrets) into an AMI (or source code in general) is considered insecure. Storing such credentials in storage space associated with a cloud computing service is similarly insecure, because the security controls and processes associated with such data storage are also typically not publicly disclosed. Hence, security limitations can often prevent organizations from leveraging the benefits of cloud computing services.

Embodiments of the present invention provide techniques for performing verification for (e.g., authenticating) cloud services, thereby allowing applications executing as cloud services to access secure data without compromising organizational security.

Cloud Service Client Verification

As described above, embedding and uploading sensitive data (e.g., access keys and/or other credentials) in application program instructions or cloud data storage is typically insecure, especially if the security policies and implementation of the hosting system are unknown. Hence, performing work upon secure data in a cloud computing environment depends on finding another way to confirm that application instances executing in a cloud computing environment (also referred to as "compute instances") are legitimate before sharing secure data with them.

In some embodiments, a compute instance executing in a cloud computing environment determines a need to access secure data and/or initiate an authenticated service. The compute instance sends a request for a credential and a set of instance-specific information to a verifying party (e.g., a server and/or compute service that authenticates requests for credentials). This verifying party then accesses a management API (application programming interface) for the cloud computing environment to retrieve a set of parameters for the compute instance. The verifying party compares these parameters with the information submitted by the compute instance to determine whether the received instance data is legitimate and correct. If so, the verifying party grants the compute instance a set of credentials that can be used to access the secure data and/or initiate the authenticated service. Note that in this disclosure the term credential can span a wide range of mechanisms that can be used to indicate (and access) authority, status, rights, entitlement to privileges, or the like. For instance, credentials may include (but are not limited to): secure keys; passwords and/or pass phrases; certificates used to establish a secure connection; symmetric or asymmetric keys used to decrypt data that has been previously encrypted and stored in an encrypted form on a computing device; and/or any.

Cloud computing environments can be very dynamic, with new compute instances being initiated and terminated on a frequent and ongoing basis in response to fluctuations in incoming requests and other factors. Verifying the identity of compute instances in such an environment, where resources are constantly being reclaimed and reused, can be challenging. Upon receiving a request from a compute instance executing as a web service, a verifying party needs a high level of assurance that the requesting party is indeed valid and legitimate, and can be entrusted with confidential information. Hence, a request from a compute instance requesting credentials will typically need to include a set of instance-specific information that is highly unlikely to be known or easily determined by other parties.

In some embodiments, a compute instance requesting credentials may assert its legitimacy by querying the metadata for its execution environment to gather and present to a verifying party a detailed set of instance-specific parameters that includes, but is not limited to, one or more of the following identifying properties:

- an instance identifier: a unique identifier assigned to the compute instance by the cloud computing environment;
- an instance type: an identifier that describes the set of compute resources that have been associated with the compute instance (e.g., the number of CPUs assigned to the compute instance, the amount of memory available to the compute instance, etc);
- a local hostname: a private DNS (domain name system) name assigned to the compute instance by the cloud computing environment; this DNS name is not visible outside of the cloud computing environment, and can only be used to communicate with the compute instance by other compute instances in the cloud computing environment;
- a public hostname: a public DNS name (optionally) assigned to the compute instance by the cloud computing environment; this DNS name is visible outside of the cloud computing environment, and can be used by other computing entities both inside and outside the cloud computing environment to communicate with the compute instance (if desired);
- a reservation identifier: a unique identifier that is assigned to two or more compute instances that are configured to operate together as a group (e.g., an auto-scaling group) to provide a specific application service;
- an IP (Internet Protocol) address: a network address assigned to the compute instance by the cloud computing environment; this IP address may range in network visibility (e.g., visible across the entire Internet, or visible only in the cloud computing environment or to a select set of compute instances in the compute environment); and
- a role: a role assigned to the compute instance to define a set of permissions or security policies that are assigned to the compute instance; for instance, a given application image may be associated with the role of a web server, database server, and/or other type of application server.

The set of parameters required by the verifying party may vary, but in general should be sufficiently numerous and varied to not be easily guessed and to confirm that the requesting compute instance indeed originated from an owning organization's uploaded machine image; in general, increasing the number of parameters that are used to perform verification increases the difficulty for a potential attacker to guess a correct set of values. Note that some of these parameters (e.g., the instance and reservation identifiers, instance type, hostnames and IP address) are assigned by the cloud computing environment upon executing a compute instance, while other parameters may be associated with the compute instance at another time (e.g., the role, which may be known at the time that the image of the compute instance is created and uploaded, or may in some scenarios also be chosen or manually specified at execution time). Note, too, that access to the management API of the cloud computing environment is also controlled and/or limited (e.g., via passwords or other access restrictions), and that the verifying party may only be able to access the identifying information for a specified set of compute instances (e.g., the set of compute instances that are associated with an account owned by an organization and are associated with the organization's verifying party). Using a set of identifying parameters that can only be derived from the operating environment of a compute instance and from the API for the cloud computing environment facilitates ensuring that the verifying information is likely only to be known by the requesting compute instance and the verifying party, thereby improving the security for the requested credentials and the secure data being accessed.

FIG. 1 illustrates an exemplary scenario in which an application image that was uploaded by an organization to a cloud computing environment 100 begins executing (operation 1) as a compute instance 102. Compute instance 102 determines that it needs one or more credentials (e.g., access keys and/or other access capabilities) to access secure data and/or initiate an authenticated service, and sends a request to a verifying party 104 (operation 2) that includes a set of instance-specific parameters that are highly unlikely to be known by other parties. Upon receiving this request, verifying party 104 requests identifying information (e.g., a set of parameters) for compute instance 102 from a compute service API 106 that manages cloud computing environment 100 (operation 3). Compute service API 106 returns the identifying information for compute instance 102 to verifying party 104 (operation 4). At this point, a decision process 108 performed by verifying party 104 can analyze a number of factors (some of which are described in more detail in subsequent paragraphs) for compute instance 102. For instance, decision process 108 compares the parameters received from compute service API 106 with the parameters submitted by compute instance 102. If the two sets of information match and any other required conditions are met, verifying party 104 grants access to the requested credential(s) (operation 7), thereby allowing compute instance 102 to access the secure data and/or initiate the authenticated service. Otherwise, verifying party 104 denies access to the requested credentials (operation 6), and may perform additional follow-up operations (e.g., contact compute service API 106 to terminate compute instance 102).

In some embodiments, a verifying party also checks the role of a compute instance to ensure that the credentials requested by the compute instance match the characteristics of the compute instance. For instance, different compute instances executing in the cloud computing environment may require different types of credentials; e.g., a web server may need a certificate, a database server may need a database password or symmetric key for encrypting or decrypting data, and other application servers may need other specific types of access capabilities, such as one or more user identifiers and/or passwords. Selectively compartmentalizing credentials across roles and checking the role associated with the compute instance further ensures that compute instances only access needed (and authorized) credentials and data and, in the worst case, limits the amount of secure data that can be compromised. In the context of the example illustrated in FIG. 1, verifying party 104 may: (1) receive role information in compute instance 102's initial request; (2) initiate an additional check (operation 5) to compute service API 106 to ensure that the received role information matches compute instance 102's actual role; and (3) consider this information in decision process 108.

In some embodiments, managing and distributing credentials can involve one or more additional checks, parameters, and/or policies. For instance:
- a verifying party may be configured to only grant credentials to a requesting compute instance during a specified, limited time interval;
- a verifying party may be configured to track the credentials that have been requested and received by each given compute instance;
- a verifying party may be configured to perform additional checks on compute instances when additional parameters are available;
- compute instances may be configured to only "hold" (e.g., store or cache) credentials for a limited timeframe; and/or
- applications may be configured to not reuse and/or recycle existing compute instances for different purposes and/or roles.

These additional capabilities are described in more detail in the following paragraphs.

In some embodiments, a verifying party only grants credentials to a given requesting compute instance during a specified, limited time interval (e.g., a given time interval after the compute instance has begun executing). In general, an organization seeking to leverage cloud computing capabilities needs to ensure and/or assume that a cloud instance beginning execution in a cloud computing environment is at least initially secure; otherwise, leveraging the cloud computing environment may not be worth the security risk. However, once a compute instance has begun executing, it may become visible to the outside world, and hence is more likely to be compromised. Thus, compute instances may be configured to initialize any authenticated services (or download any secure data) that require additional credentials in some initial "bootstrapping" time interval, when they are least likely to have been compromised already (e.g., immediately or within a few minutes of being executed, before the compute instance has begun servicing any client requests and before the compute instance's hostname and IP address have been distributed to a load balancer and/or any potential clients). A verifying party can in turn check to confirm that a compute instance requesting a set of access capabilities was started recently, and enforce this notion of a "secure bootstrapping service."

For example, in the context of FIG. 1, verifying party 104 can, as part of decision process 108, determine based on the instance information received from compute service API 106 when compute instance 102 began executing and whether the request was made in a timely manner (e.g., within a specified time interval); if not, verifying party 104 may automatically deny access to the requested credentials (and possibly flag or terminate compute instance 102 for being potentially compromised, misconfigured, and/or corrupted). Note that the specified time interval may need to be carefully set to balance reducing security risks with ensuring that normal application and/or network delays do not result in overly aggressive actions against a stalled compute instance and/or an overloaded verifying party.

In some embodiments, a verifying party tracks the credentials that have been requested by and granted to each given compute instance. For instance, the verifying party may maintain a lookup table (e.g., a hash table) that tracks the set of credentials that have been previously distributed to each compute instance and ensure that the set of requests for each given compute instance is not anomalous or suspicious (e.g., detect compute instances that repeatedly request the same credentials, make multiple requests that span multiple different roles, and/or make an excessively large number of requests). For example, in the context of FIG. 1, verifying party 104 may update a local lookup table (operation 9) every time a credential is granted (and/or denied), and then query this lookup table as part of decision process 108. Verifying party 104 may also be configured to detect and automatically reject anomalous requests received from compute instance 102 (and possibly flag or terminate compute instance 102 for being potentially compromised, misconfigured, and/or corrupted).

Note that the dynamic nature of the cloud computing environment motivates a dynamic and flexible lookup structure. More specifically, the number and identities of participating compute instances and the set of credentials that are needed by each compute instance may change based on changing underlying data sets and user access patterns, and hence the set of hash values that will need to be dynamically computed and verified will change on an ongoing basis. For instance, the size and the hash function of a lookup table may need to be adjusted over time depending on the number of previous requests and credentials that need to be tracked. However, in some scenarios other factors may facilitate optimizing lookup table structure and operation. For example, if these tracking capabilities are combined with the above-described secure bootstrapping service, a verifying party may only need to store request information for each given compute instance for the duration of the (initial) specified bootstrapping time interval; after this time interval, the stored values associated with this compute instance can be deleted from the lookup table, because all subsequent requests for that compute instance will be automatically rejected for exceeding the time interval. Such optimizations can substantially simplify the size of the lookup table and reduce tracking overhead.

In some embodiments, a verifying party may be configured to perform additional checks for a compute instance that has sent a request. Furthermore, in some embodiments a verifying party may also receive parameters to be verified for the compute instance via a range of mechanisms. For instance, a verifying party may receive an IP address for the compute instance via a TCP packet, an HTTP (Hypertext Transfer Protocol) header, and/or as an actual parameter in the compute instance's request. The verifying party can then compare one or more of these IP addresses with the IP address that was received for the compute instance via the management API. More specifically, the actual method for determining the IP address (or other parameters for the compute instance) may vary depending on the organization of the cloud computing environment and one or more verifying parties. For example, in some instances a verifying party may check to confirm that the originating IP address for a request is the same IP address specified in the request's included instance information, and confirm via the management API for the cloud computing environment that this IP address is associated with the organization's account. If this is not the case, the verifying party denies the request. Note that determining the correct IP address associated with a given compute instance may involve some additional effort depending on the configuration of the compute instance and the verifying party. For example, the verifying party may comprise a process that executes on a standalone server, or may also comprise a compute instance executing in the same cloud computing environment as the compute instance that is submitting the request. Furthermore, this verifying process may also be deployed behind either a private load balancing device or service (e.g., a load balancing service that executes in, and may only be visible to a portion of, the cloud computing environment) or a public load balancing device or service (e.g., a load balancing service that executes in, but is also visible externally to, the cloud computing environment). A verifying process may need to consider some of these configuration possibilities, for instance when determining whether to extract a compute instance's IP address from either an HTTP x-forwarded-for header (e.g., when a verifying party is behind a proxy) or a TCP (Transmission Control Protocol) packet.

In some embodiments, compute instances may be coded to only cache the credentials needed to access secure data and/or initiate an authenticated service for a limited timeframe. For instance, a given compute instance may only need a requested credential briefly to initiate an authenticated operation (e.g., to initialize a persistent connection to a trusted server in an organization's internal data center or download a set of secure data); after performing the operation that involves the credential, the compute instance flushes any stored credentials to ensure that they cannot be used subsequently even if the compute instance becomes compromised. Such techniques limit the scope of damage that can result from a subsequent compromise (e.g., for the above example of a persistent connection to a trusted server, a subsequent compromise may lead to abuse of that existing persistent connection, but preserving the safety of the credentials prevents attackers from using stolen credentials to make additional malicious connections to the trusted server). In the context of FIG. 1, compute instance 102 initiates the authenticated service (operation 8) after being granted access to the requested set of access capabilities (operation 7). After the operation that involves the credential(s) completes, compute instance 102 deletes the received credential(s) to ensure that they cannot subsequently be compromised (operation 10).

Note that the above-described bootstrapping, tracking, and deletion techniques can be performed simultaneously to provide a higher level of security for credentials. More specifically, compute instances can be configured to request credentials, use them to establish any secure connections as quickly as possible, and then flush the received credentials. This behavior is enforced by the verifying party, which ensures that previously requested credentials cannot be regained and that no credentials can be gained after a compute instance's bootstrapping interval has expired. After the bootstrapping interval has expired, the compute instance is already connected to any authenticated services and has discarded all credentials, thereby preventing any future attackers from stealing the credentials.

In some embodiments, applications that leverage cloud computing capabilities are configured to disfavor the re-purposing and recycling of existing compute instances into different purposes and/or roles. Instead, the characteristics of cloud computing environments and the above-disclosed techniques for securely accessing and managing credentials motivate disposing of compute instances that are no longer needed and restarting new compute instances (which request new credentials) as needed. Where a traditional data center often involves static infrastructure (e.g., static server names and identifiers, static instance identifiers, etc.), in a cloud computing environment identifiers are flexible and transitory, and compute instances may be grouped into adaptable auto-scaling groups that are composed of multiple similar compute instances. Some of the compute instances in such groups may run for days (or longer), while others may be created and decommissioned in a matter of hours or minutes. The inherent redundancy available in this environment reduces the performance penalty of decommissioning and starting services; even if a given compute instance is terminated, a load balancer can redirect that compute instance's traffic to similar instances running in the same auto-scaling group while a new compute instance is instantiated and acquires the needed credentials. The management interface for the cloud computing environment keeps track of these changing compute instances in real time, and can provide any needed information to the verifying party via the compute service API.

Figure 2:
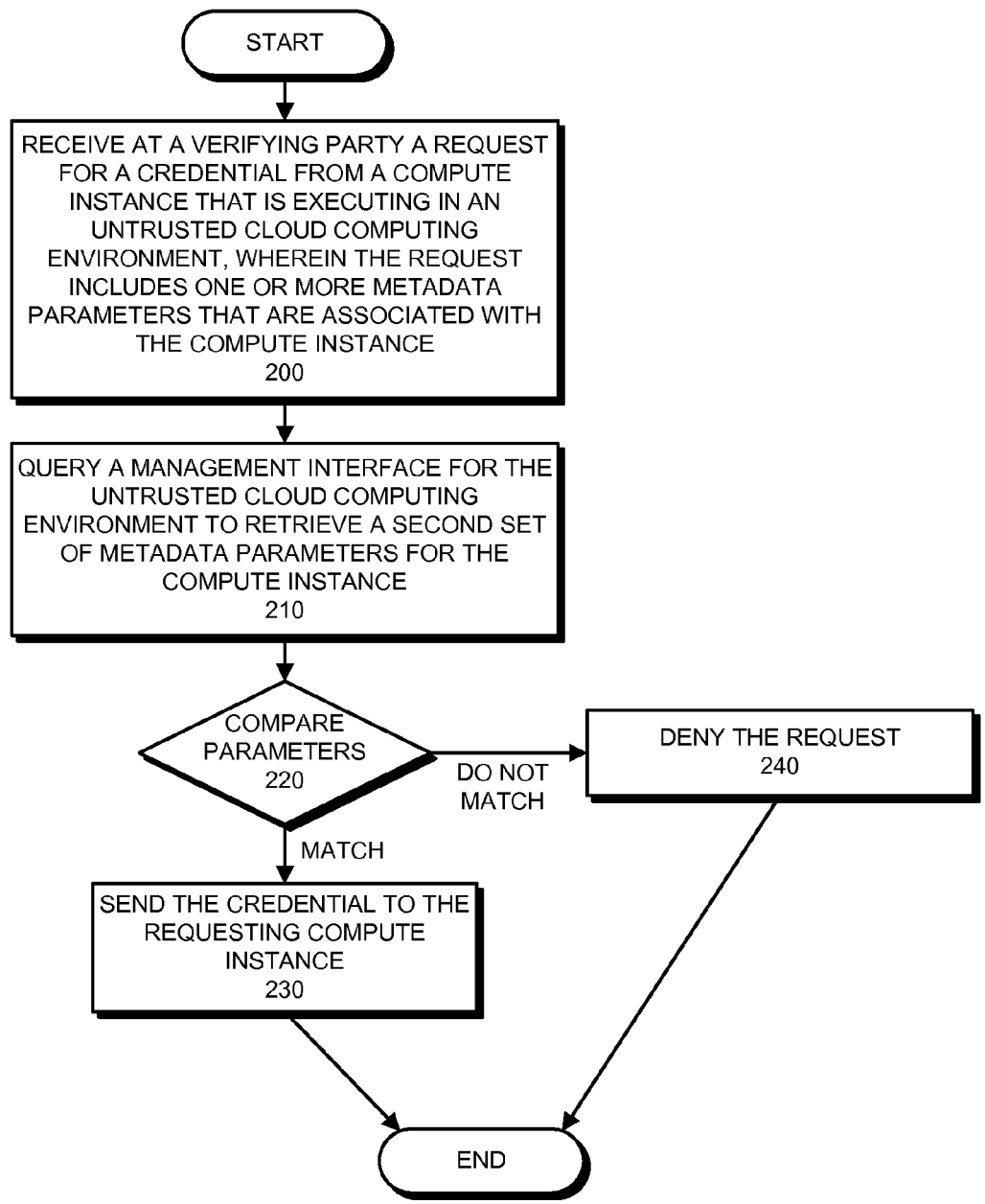
FIG. 2 presents a flow chart that illustrates the process of authenticating a cloud service in accordance with an embodiment.

FIG. 2 presents a flow chart that illustrates the process of authenticating a cloud service. During operation, a verifying party receives a request for a credential from a compute instance that is executing in an untrusted cloud computing environment (operation 200). This request includes one or more metadata parameters that are associated with the compute instance. The verifying party queries a management interface for the untrusted cloud computing environment to retrieve a second set of metadata parameters for the compute instance (operation 210). The verifying party compares the two sets of parameters (operation 220). If the values for the two sets of parameters match, the verifying party grants the credential to the requesting compute instance (operation 230). Otherwise, the verifying party denies the request (operation 240).

In summary, embodiments of the present invention involve authenticating cloud services, thereby allowing applications executing as cloud services in an untrusted cloud computing environment to access secure data without compromising organizational security. A verifying party compares a set of parameters supplied by a compute instance with a corresponding set of parameters that are supplied by a management API for the untrusted cloud computing environment, and only grants a requested credential to the compute instance if the two sets of parameters match. These techniques facilitate establishing trust between the compute instance and an organization's internal data centers, thereby allowing the transfer of sensitive data to the compute instance while reducing the risk of the credentials being compromised.

Computing Environment

Figure 3:
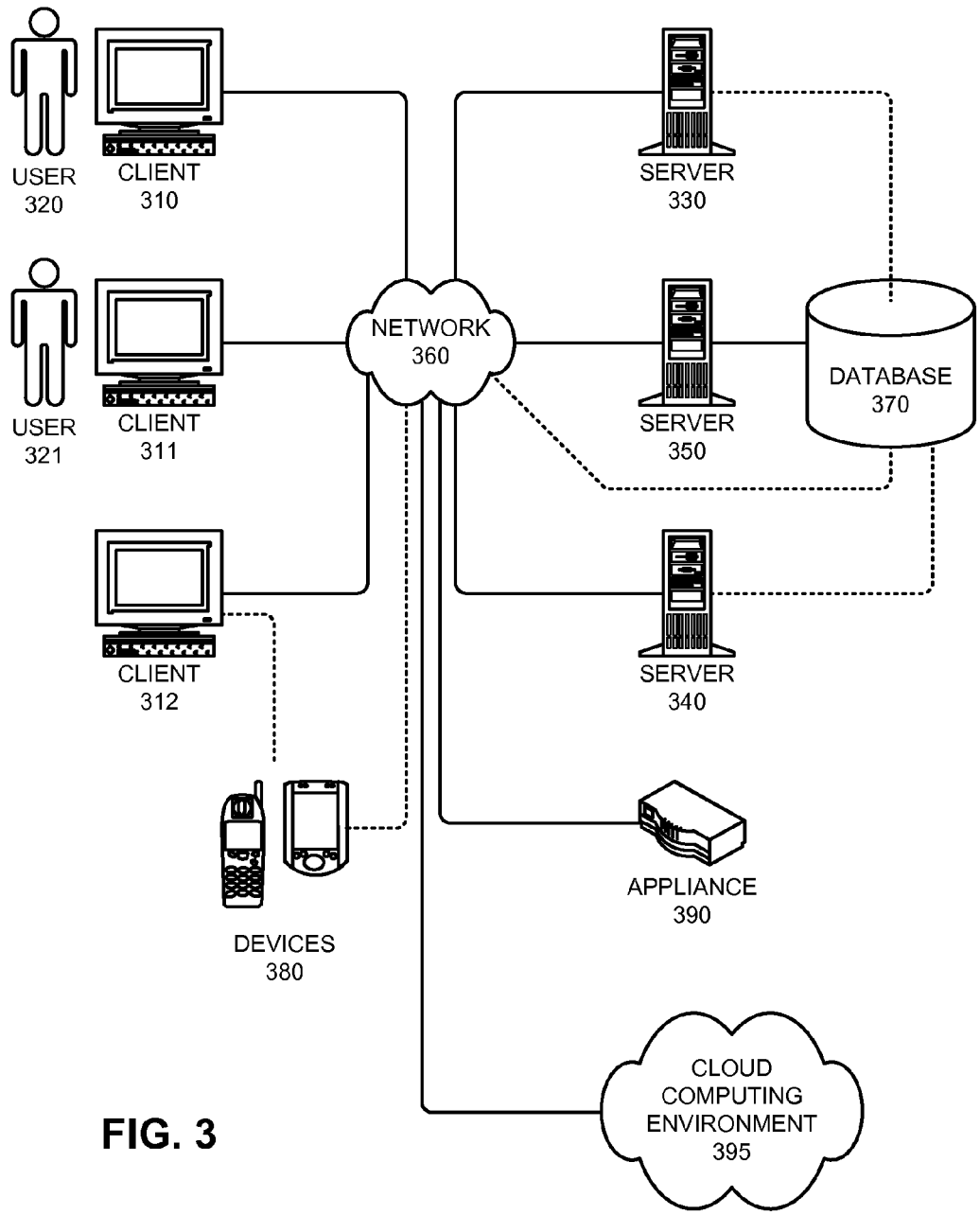
FIG. 3 illustrates a computing environment in accordance with an embodiment.

In some embodiments of the present invention, techniques for authenticating cloud services can be incorporated into a wide range of computing devices in a computing environment. For example, FIG. 3 illustrates a computing environment 300 in accordance with an embodiment of the present invention. Computing environment 300 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 3, computing environment 300 includes clients 310-312, users 320 and 321, servers 330-350, network 360, database 370, devices 380, appliance 390, and cloud computing environment 395.

Clients 310-312 can include any node on a network that includes computational capability and includes a mechanism for communicating across the network. Additionally, clients 310-312 may comprise a tier in an n-tier application architecture, wherein clients 310-312 perform as servers (servicing requests from lower tiers or users), and wherein clients 310-312 perform as clients (forwarding the requests to a higher tier).

Similarly, servers 330-350 can generally include any node on a network including a mechanism for servicing requests from a client for computational and/or data storage resources. Servers 330-350 can participate in an advanced computing cluster, or can act as standalone servers. For instance, computing environment 300 can include a large number of compute nodes that are organized into a computing cluster and/or server farm. In one embodiment of the present invention, server 340 is an online "hot spare" of server 350.

Users 320 and 321 can include: an individual; a group of individuals; an organization; a group of organizations; a computing system; a group of computing systems; or any other entity that can interact with computing environment 300.

Network 360 can include any type of wired or wireless communication channel capable of coupling together computing nodes. This includes, but is not limited to, a local area network, a wide area network, or a combination of networks. In one embodiment of the present invention, network 360 includes the Internet. In some embodiments of the present invention, network 360 includes phone and cellular phone networks.

Database 370 can include any type of system for storing data in non-volatile storage. This includes, but is not limited to, systems based upon magnetic, optical, or magneto-optical storage devices, as well as storage devices based on flash memory and/or battery-backed up memory. Note that database 370 can be coupled: to a server (such as server 350), to a client, or directly to a network. In some embodiments of the present invention, database 370 is used to store information related to diagnostic information and/or diagnostic formatters. Alternatively, other entities in computing environment 300 may also store such data (e.g., servers 330-350).

Devices 380 can include any type of electronic device that can be coupled to a client, such as client 312. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 380 can be coupled directly to network 360 and can function in the same manner as clients 310-312.

Appliance 390 can include any type of appliance that can be coupled to network 360. This includes, but is not limited to, routers, switches, load balancers, network accelerators, and specialty processors. Appliance 390 may act as a gateway, a proxy, or a translator between server 340 and network 360.

Cloud computing environment 395 can include any type of networked storage and/or compute devices (e.g., a federation of homogeneous or heterogeneous computing devices) that together provide data storage and/or compute capabilities to one or more clients.

Note that different embodiments of the present invention may use different system configurations, and are not limited to the system configuration illustrated in computing environment 300. In general, any device that supports authenticating cloud services may incorporate elements of the present invention.

Figure 4:
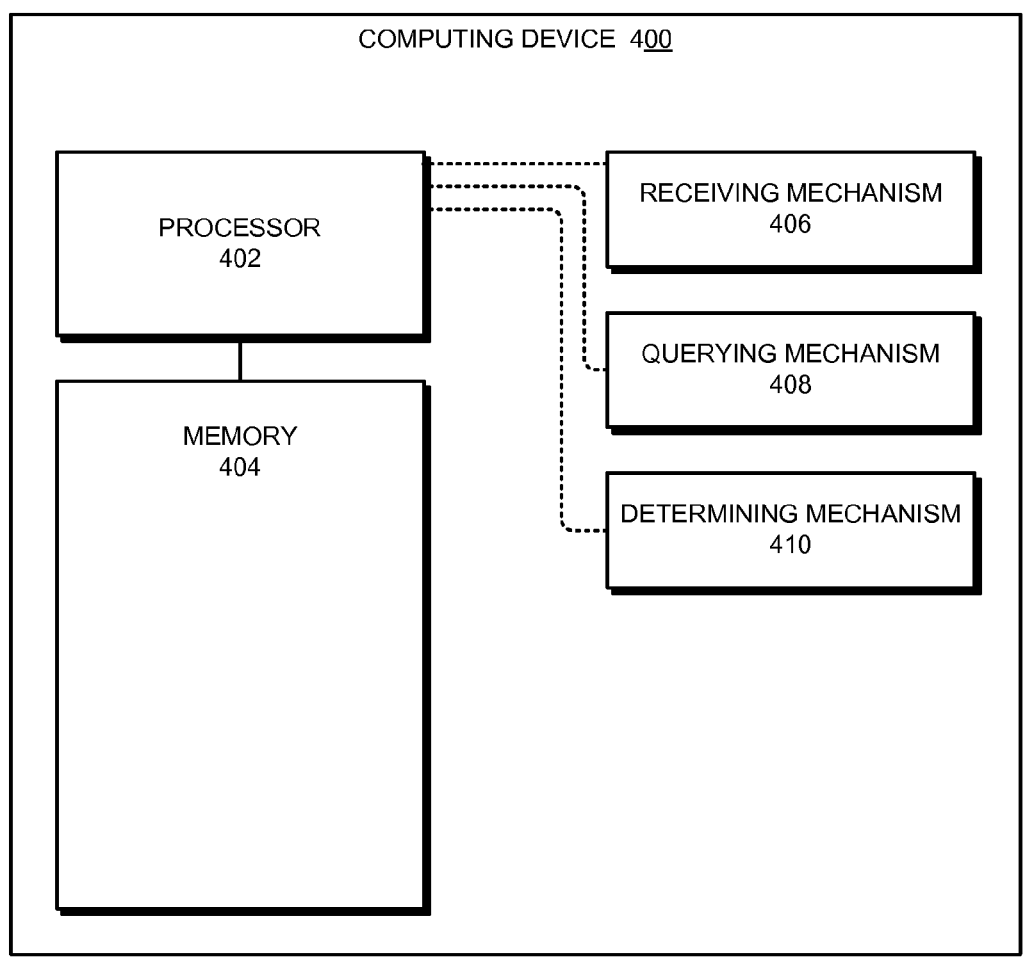
FIG. 4 illustrates a computing device in accordance with an embodiment.

FIG. 4 illustrates a computing device 400 that includes a processor 402 and a memory 404. Computing device 400 also includes a receiving mechanism 406, a querying mechanism 408, and a determining mechanism 410. Computing device 400 uses receiving mechanism 406, querying mechanism 408, and determining mechanism 410 to authenticate cloud services.

During operation, computing device 400 uses receiving mechanism 406 to receive a request for a credential from a compute instance executing in an untrusted cloud computing environment. This request includes one or more metadata parameters that are associated with the compute instance. Querying mechanism 408 queries a management interface for the untrusted cloud computing environment to retrieve a second set of metadata parameters for the compute instance. Determining mechanism 410 then compares the two sets of parameters. If the values for the two sets of parameters match, determining mechanism 410 grants the credential to the requesting compute instance. Otherwise, determining mechanism 410 denies the request.

In some embodiments of the present invention, some or all aspects of receiving mechanism 406, querying mechanism 408, and/or determining mechanism 410 can be implemented as dedicated hardware modules in computing device 400. These hardware modules can include, but are not limited to, processor chips, application-specific integrated circuit (ASIC) chips, field-programmable gate arrays (FPGAs), memory chips, and other programmable-logic devices now known or later developed.

Processor 402 can include one or more specialized circuits for performing the operations of the mechanisms. Alternatively, some or all of the operations of receiving mechanism 406, querying mechanism 408, and/or determining mechanism 410 may be performed using general-purpose circuits in processor 402 that are configured using processor instructions. Thus, while FIG. 4 illustrates receiving mechanism 406, querying mechanism 408, and determining mechanism 410 as being external to processor 402, in alternative embodiments some or all of these mechanisms can be internal to processor 402.

In these embodiments, when the external hardware modules are activated, the hardware modules perform the methods and processes included within the hardware modules. For example, in some embodiments of the present invention, the hardware module includes one or more dedicated circuits for performing the described operations. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for authenticating cloud services, the method comprising:
receiving a request for a credential from a compute instance executing in a cloud computing environment, wherein the request comprises a first set of metadata specific to the compute instance;

wherein the credential is associated with a compute role;
wherein the method further comprises denying the compute instance access to the credential when a second compute role associated with the credential key does not match the compute role of the compute instance;
tracking the credentials that have been requested by and granted to the compute instance;
determining anomalous requests from the compute instance;
querying a management interface for the cloud computing environment to retrieve a second set of metadata specific to the compute instance; and
upon determining that the first set of metadata matches the second set of metadata, granting the credential to the compute instance.

2. The computer-implemented method of claim 1, wherein anomalous requests comprise:
two or more requests for the same credential;
two or more requests for credentials that span multiple different compute roles; and
an excessively large number of requests for different credentials.

3. The computer-implemented method of claim 2, wherein determining anomalous requests further comprises:
denying the request; and
terminating the compute instance.

4. The computer-implemented method of claim 1, wherein the method further comprises:
determining an elapsed time for which the compute instance has been executing; and
denying the compute instance access to the credential when the elapsed time exceeds a specified bootstrapping time interval.

5. The computer-implemented method of claim 4, wherein tracking the credentials that have been requested by and granted to the compute instance further comprises:
tracking previous requests for the compute instance in a lookup table; and
retiring the tracked requests for the compute instance after the elapsed time exceeds the specified bootstrapping time interval.

6. The computer-implemented method of claim 5, wherein the first set of metadata comprises:
an instance identifier for the compute instance;
an instance type associated with the compute instance;
a hostname associated with the compute instance;
a reservation identifier associated with a group of compute instances that includes the compute instance;
an IP address used by the compute instance; and
the compute role associated with the compute instance.

7. The computer-implemented method of claim 6,
wherein the group of compute instances comprises a dynamic auto-scaling group that changes over time based on client request load and other factors; and
wherein a control application that manages the number of compute instances in the dynamic auto-scaling group is configured to favor starting new compute instances over reusing existing compute instances to facilitate maintaining the security of credentials in the untrusted cloud computing environment.

8. The computer-implemented method of claim 6, wherein the method further comprises:
determining a source IP address from which the request was sent;
comparing the source IP address with a first IP address included in the first set of metadata and a second IP address included in the second set of metadata; and
denying the request if the source IP address, first IP address, and the second IP address do not match.

9. The computer-implemented method of claim 1,
wherein, upon receiving the credential, the compute instance is configured to only cache the credential for a limited timeframe to perform an authenticated operation; and
wherein, upon completing the authenticated operation, the compute instance is configured to flush the stored credential.

10. A non-transitory computer-readable storage medium storing instructions that when executed by a computer cause the computer to perform a method for authenticating cloud services, the method comprising:
receiving a request for a credential from a compute instance executing in a cloud computing environment, wherein the request comprises a first set of metadata specific to the compute instance;
wherein the credential is associated with a compute role;
wherein the method further comprises denying the compute instance access to the credential when a second compute role associated with the credential key does not match the compute role of the compute instance;
tracking the credentials that have been requested by and granted to the compute instance; determining anomalous requests from the compute instance;
querying a management interface for the cloud computing environment to retrieve a second set of metadata specific to the compute instance; and
upon determining that the first set of metadata matches the second set of metadata, granting the credential to the compute instance.

11. The non-transitory computer-readable storage medium of claim 10, wherein anomalous requests comprise:
two or more requests for the same credential;
two or more requests for credentials that span multiple different compute roles; and
an excessively large number of requests for different credentials.

12. The non-transitory computer-readable storage medium of claim 11, wherein determining anomalous requests further comprises:
denying the request; and
terminating the compute instance.

13. The non-transitory computer-readable storage medium of claim 10, wherein the method further comprises:
determining an elapsed time for which the compute instance has been executing; and
denying the compute instance access to the credential when the elapsed time exceeds a specified bootstrapping time interval.

14. A computing device configured to authenticate cloud services, comprising:
a processor;
a memory;
a receiving mechanism configured to receive a request for a credential from a compute instance executing in a cloud computing environment, wherein the request comprises a first set of metadata specific to the compute instance;
wherein the credential is associated with a compute role;
a denying mechanism to deny the compute instance access to the credential when a second compute role associated with the credential key does not match the compute role of the compute instance;

a tracking mechanism configured to track the credentials that have been requested by and granted to the compute instance;

a determining mechanism configured to determine anomalous requests from the compute instance;

a querying mechanism configured to query a management interface for the cloud computing environment to retrieve a second set of metadata specific to the compute instance;

wherein the determining mechanism is further configured to compare the first set of metadata with the second set of metadata; and wherein the determining mechanism is further configured to grant the credential to the compute instance if the first set of metadata matches the second set of metadata.

15. The method of claim 1, wherein the computing instance determines the first set of metadata by querying the cloud computing environment, wherein the request for the credential is received at a server that is executing outside of the cloud computing environment, wherein querying the management interface comprises the server querying the management interface to retrieve the second set of metadata, and wherein granting the credential to the compute instance comprises the server granting the credential to the compute instance.

16. The method of claim 15, wherein the cloud computing environment is an untrusted cloud computing environment.

* * * * *